United States Patent [19]
Rönnmark et al.

[11] 3,806,571

[45] Apr. 23, 1974

[54] METHOD FOR THE MANUFACTURE OF REINFORCED, STEAM-CURED LIGHT-WEIGHT CONCRETE AND A COMPOSITION FOR CARRYING OUT THE METHOD

[75] Inventors: Kjell O. Rönnmark; Bertil J. M. Schmidt, both of Sodertalje, Sweden

[73] Assignee: Internationella Siporex Aktiebolaget, Malmo, Sweden

[22] Filed: July 5, 1968

[21] Appl. No.: 742,550

[30] Foreign Application Priority Data
July 6, 1967 Sweden.............................. 10348/67

[52] U.S. Cl..................... 264/82, 106/89, 260/296, 260/296 S, 264/135, 264/333
[51] Int. Cl....................... C04b 15/12, B32b 31/12
[58] Field of Search ................... 260/29.6 S; 106/89; 264/228, 82, 135, 333

[56] References Cited
UNITED STATES PATENTS

| | | | |
|---|---|---|---|
| 2,921,463 | 1/1960 | Goldfein | 264/228 |
| 3,360,493 | 12/1967 | Evans | 260/29.6 |
| 3,196,122 | 8/1965 | Evans | 260/29.6 S |
| 3,256,229 | 6/1966 | Janota et al. | 260/29.6 S |

*Primary Examiner*—White : Robert F.
*Assistant Examiner*—Thomas P. Pavelko
*Attorney, Agent, or Firm*—Fred C. Phillitt

[57] ABSTRACT

A method for the manufacture of metal reinforced, steam-cured, light weight concrete where the metal reinforcement is provided with a protective coating thereon prior to being embedded in the concrete. The protective coating comprises an aqueous mixture of 60 – 90 percent by weight of Portland Cement, 10 – 50 percent of water, and 2 – 20 percent by weight of a copolymer selected from the group consisting of copolymers of acrylic acid ethyl ester, methacrylic acid methyl ester, methacrylic butyl ester, and methacrylic acid isobutyl ester.

3 Claims, No Drawings

METHOD FOR THE MANUFACTURE OF REINFORCED, STEAM-CURED LIGHT-WEIGHT CONCRETE AND A COMPOSITION FOR CARRYING OUT THE METHOD

The present method is concerned with a method for the manufacture of reinforced, steam-cured light-weight concrete, the reinforcing elements being coated with a dense anti-corrosive layer from an aqueous mixture containing a hydraulic binder and a stabilized dispersion of a sealing agent for the anticorrosive layer, whereupon the reinforcing elements are embedded in light weight concrete mass, said aqueous mixture containing 1-10 per cent of the sealing agent, based on the weight of the hydraulic binder.

Such a method is previously known (see German published Patent Specification No. 1,073,932). According to one embodiment thereof, there is employed an emulsion of rubber stabilized with casein as a stabilized dispersion of a sealing agent for the anti-corrosive layer. In addition to the emulsion it is necessary to add a binding regulator for the hydraulic cement to the aqueous mixture. Casein may also be used as a binding regulator. Even though the coating composition yields very good protection against corrosion on the reinforcing elements, and the applied coating is effectively bound to both the elements and the light-weight concrete at the same time as it obtains a dense structure, it must be considered a disadvantage that the cement slurry must be provided with large quantities of stabilizer for the rubber and a binding regulator for the hydraulic cement.

It has now been surprisingly discovered that the aforementioned disadvantage can be avoided or substantially reduced if the aqueous mixture containing the hydraulic cement, is added with a non-ionic or preferably anionic suspension of a polymer of a compound and/or a copolymer of two or more compounds of the formula

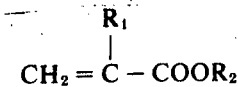

$$CH_2 = C - COOR_2$$

wherein $R_1$ is hydrogen or methyl and $R_2$ is an alkyl group, preferably a lower alkyl group, as stabilized dispersion. In this composition may vary within wide limits. However, this quantity normally lies between 60 and 90 percent by weight, based upon the total weight of the aqueous mixture. The water content may also vary within wide limits, but normally lies between 10 and 50 percent by weight, based on the total weight of the aqueous mixture. The content of polymer and/or copolymer lies usually between 2 and 20 percent by weight, calculated in the same manner, even though values lying outside these limits may be applicable in individual cases.

The invention is also concerned with a treatment composition for reinforcing elements in steam cured light-weight concrete, the composition being intended for use in the aforedescribed method. The novel composition comprises an aqueous mixture which contains a hydraulic cement and a stabilised dispersion of a sealing agent for the anti-corrosive layer applied to the reinforcing elements, the aqueous mixture containing 1-10 % of the sealing agent. According to the invention, the composition contains as a stabilised dispersion of the sealing agent a nonionic or preferably anionic suspension of the polymer of a compound and/or a copolymer of two or more compounds of the above given formula.

A composition according to the invention may have the following composition:

60 - 90 % of hydraulic cement
10 - 50 % of water
2 - 20 % of polymer and/or copolymer as defined above, all calculated in percent by weight based on the total weight of the coating composition, it being assumed that the mutual ratio between the acrylate and-/or methacrylate in relation to the cement lies between 1 and 10 percent by weight.

The coating composition according to the invention may, in addition to the aforementioned obligatory ingredients, also manner the necessity of adding a special binding regulator for the cement is obviated, as the suspension is also capable of fulfilling this purpose.

A most essential advantage presented by the described coating composition is that because of its thixotropic properties it is easy to apply to the reinforcing elements. Concerning an aqueous mixture containing a hydraulic cement, rubber as a sealing agent and casein as a stabilizing agent and binding regulator, it is generally necessary to immerse the reinforcing elements three times in the treatment composition, whereas the coating composition of the present invention affords an extraordinary excellent coating after the rods have been dipped twice.

Examples of polymers of a compound having the above given formula are polyacrylic acid ethyl ester, polyacrylic isopropyl ester, polyacrylic acid n-butyl ester and polyacrylic acid isobutyl ester, and also polymethacrylic acidmethyl ester, polymethacrylic acid ethyl ester and polymethacrylic acid butyl ester.

As a copolymer of two or more compounds of the aforementioned formula can be mentioned the copolymer of acrylic acid ethyl ester and methacrylic acid methyl ester, the copolymer of methacrylic acid butyl ester, methacrylic acidisobutyl ester and the copolymer of acrylic acid ethyl ester and methacrylic acid butyl ester.

In the known method described in the German published patent specification the amount of sealing agent in relation to the hydraulic cement lies between 1 and 10 percent by weight. According to the present invention smaller amounts may be used, e.g., amounts which lie within the limits of between 1 and 8 percent or between 1 and 6 percent. It lies within the expertise of the expert to establish in each particular case the amount which gives optimal results. The percentage of hydraulic cement in the used coating contain facultative constituents. Particular examples of such constituents are methyl cellulose and ethylhydroxyethyl cellulose, which act as binding agents for the cement.

It is, admittedly, previously known to use polyacrylate or polymethacrylates as coating material on reinforcing elements for light-weight concrete or heavy concrete, which may be of the steam cured type (see the French patent specification No. 1,080,283, page 2, left hand column, lines 14-15). In this instance it is intended that the plastic material shall solely serve as an anti-corrosive agent for the reinforcing elements, and before said elements are embedded in the concrete the plastic layer is applied thereto with an extra intermediate layer, which is intended to facilitate adhesion to the concrete. It is stated further on in the specification that if the protective layer is applied from an aqueous emulsion, in which the dispersed phase is thus liquid, it can be provided with varying amounts of cement as a filler. However, the conclusion that it would be desirable or expedient to add a suspension of polyacrylates and/or polymethacrylates, in which the dispersing synthetic resin exists in solid form, with a hydraulic cement in such a quantity that the amount of the synthetic resin material in the mixture reaches to about 1-10 % calculated on the weight of the hydraulic cement, cannot be drawn from the specification.

The invention will now be described with reference to a number of examples.

EXAMPLE 1

The following coating composition was made up:-

| | |
|---|---|
| Portland cement | 100 parts |
| water | 30 do. |
| copolymer of acrylic acid ethyl ester and methylacrylic acid methyl ester | 12 do. |

The components were mixed thoroughly and worked. The coating composition was applied to reinforcing rods for light-weight concrete by immersion, whereupon it was found that two immersion operations were sufficient to obtain a very good coating. The applied coating was then allowed to dry in air for some hours. In this manner a dense, well adhered elastic film was obtained on the reinforcing rods, which were then embedded in the light-weight concrete compound. The resulting product was subjected to a steam curing process at a pressure of 10 kg/cm² for approx. 20 mins., whereby the coating was converted to a hard, very dense layer, which was effectively bonded to the surrounding light conrete.

EXAMPLE 2

The following coating composition was made up:-

| | |
|---|---|
| Portland cement | 100 parts |
| water | 35 do. |
| copolymer of methacrylic acid butyl ester and methacrylic acid butyl ester and methacrylic acid isobutyl ester | 9 do. |
| ethylhydroxyethylcellulose | 0.15 parts |

In a similar manner to that described in Example 1 a hard and dense layer was obtained as well as an effective bond with the surrounding light-weight concrete subsequent to applying the composition to reinforcing rods intended for light-weight concrete and embedding the rods in the concrete compound and steam hardening the resulting product.

EXAMPLE 3

The following coating composition was prepared:

| | |
|---|---|
| Portland cement | 100 parts |
| water | 20 do. |
| copolymer of acrylic acid ethyl ester and methacrylic acid butyl ester | 18 do. |
| methyl cellulose | 4.2 do. |

In a similar manner to that described in example 1 a hard and dense layer was obtained, effectively bonded to the surrounding light-weight concrete, subsequent to applying the composition to reinforcing rods of the light-weight concrete and embedding the rods in the concrete compound and steam hardening the resulting product.

We claim:

1. A method for the manufacture of reinforced, steam-cured, light-weight concrete; comprising applying to a metallic reinforcing rod a coating comprising an aqueous suspension of 60-90% by weight of Portland cement, 10-50% of water, and 2-20% by weight of a solid-form copolymer selected from the group consisting of copolymers of acrylic acid ethyl ester, methacrylic acid methyl ester, methacrylic acid butyl ester, and methacrylic acid isobutyl ester; drying said coating without curing to obtain a dense elastic film about the reinforcing structure; disposing the reinforcing structure in a steam-curable, light-weight concrete mass and steam curing the resultant reinforced structure to thereby convert said coating to a hard, dense layer effectively bonded to the surrounding light-weight concrete and to cure said light-weight concrete.

2. A method according to claim 1 characterized in that the mixture is an anionic suspension.

3. A method according to claim 1 characterized in that the mixture is a non-ionic suspension.

* * * * *